(No Model.) 2 Sheets—Sheet 1.
J. P. CARMICHAEL.
DENTAL TOOL.
No. 392,006. Patented Oct. 30, 1888.
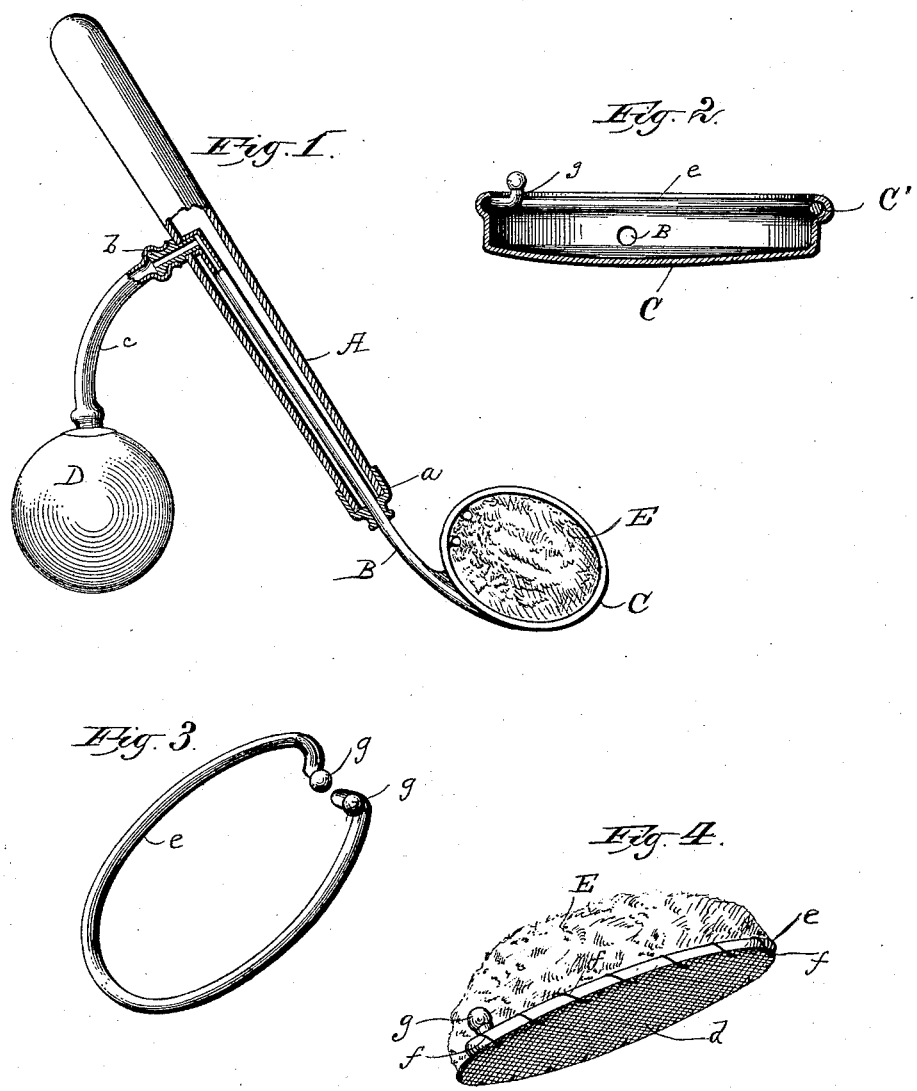

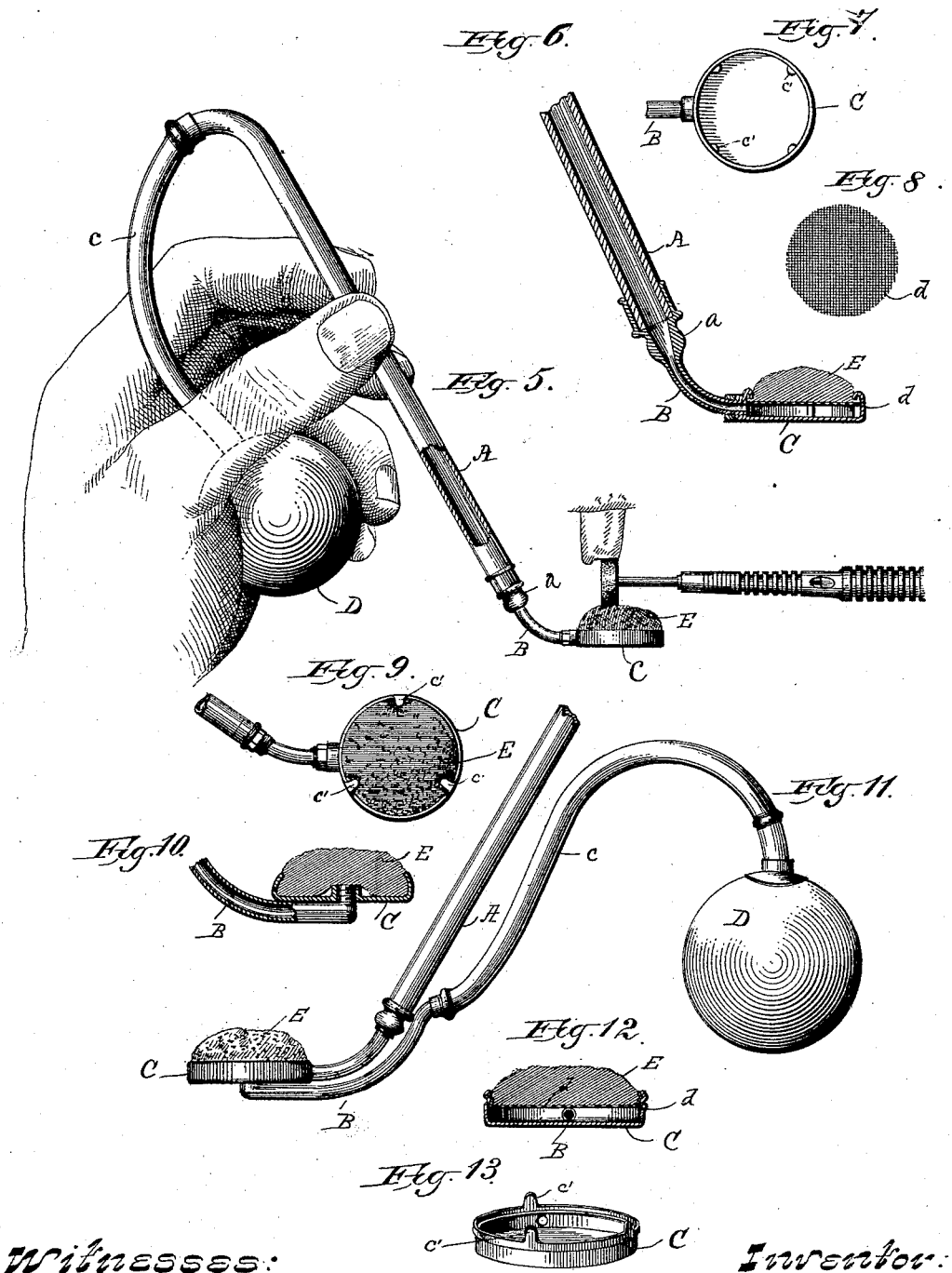

UNITED STATES PATENT OFFICE.

JOHN P. CARMICHAEL, OF MILWAUKEE, WISCONSIN.

DENTAL TOOL.

SPECIFICATION forming part of Letters Patent No. 392,006, dated October 30, 1888.

Application filed September 3, 1888. Serial No. 284,409. (No model.)

*To all whom it may concern:*

Be it known that I, JOHN P. CARMICHAEL, of Milwaukee, in the county of Milwaukee, and in the State of Wisconsin, have invented certain new and useful Improvements in Dental Instruments; and I do hereby declare that the following is a full, clear, and exact description thereof.

My invention relates to dental tools; and it consists in a device for moistening the corundum-wheel while in operation, as will be fully described hereinafter.

In the drawings, Figure 1 is a perspective view of my device, partly in longitudinal section. Fig. 2 is a section of the sponge-cup; Fig. 3, a perspective view of the sponge-holder detached from the cup. Fig. 4 is a perspective view of the sponge and its backing. Fig. 5 is an elevation showing the device in working position. Fig. 6 is a detail section. Figs. 7, 8, 9, 10, 12, and 13 are details, and Fig. 11 a perspective view, of a modified form of my device.

A is a hollow handle, having a cap, $a$, at its lower end, in which is fitted a tube, B, the lower end of which opens up into a shallow cup, C, while its upper end is coupled to a short tube, $b$, that extends through an opening in the handle. The outer end of tube $b$ is enlarged to receive a flexible tube, $c$, that has a bulb, D, connected with it.

E is a sponge, that preferably is formed with a gauze backing, $d$, which is bordered by an elastic split ring, $e$, and secured thereto by wire $f$, or any other suitable means. This ring has thumb-pieces $g$ projecting up from it, by which it may be grasped and compressed to permit it to enter a groove, C′, in the cup C, which groove holds it in the cup.

The tube B may enter the bottom or side of the cup, and the sponge may be without any backing and be held in the cup by the overhanging edges thereof, as in Figs. 9 and 10; or the ring may be dispensed with and the backing formed with a rim that is secured by inbending the metal of the cup; or by inbending the points $e'$ the sponge may be secured therein.

As in Fig. 5, the tube B may be coupled to the lower end of the handle and the tube $c$ to its upper end.

The joint between the tubes A and B may be swiveled, so as to permit the cup to be turned at any desired angle.

As shown in Fig. 11, the handle and tube may be separate from each other, with the bulb connected with the upper end of the tube.

In operation, water is drawn through the sponge by first compressing the bulb and then permitting it to expand, and then it is expelled as needed by compressing the bulb. It is to be used for dampening the grinding-wheel and gathering the grit and clearing the tooth being operated upon, and also for holding the cheek away from the instrument.

Having thus fully described my invention, what I claim as new, and desire to secure by Letters Patent, is—

In a dental instrument, the combination, with a sponge-cup and means for removably securing a sponge therein, of a rigid tube leading into said cup, a bulb connected by a flexible tube with said rigid tube, and a handle for said sponge-cup, substantially as described.

In testimony that I claim the foregoing I have hereunto set my hand, at Milwaukee, in the county of Milwaukee and State of Wisconsin, in the presence of two witnesses.

JOHN P. CARMICHAEL.

Witnesses:
S. S. STOUT,
N. E. OLIPHANT.